Figure 1:
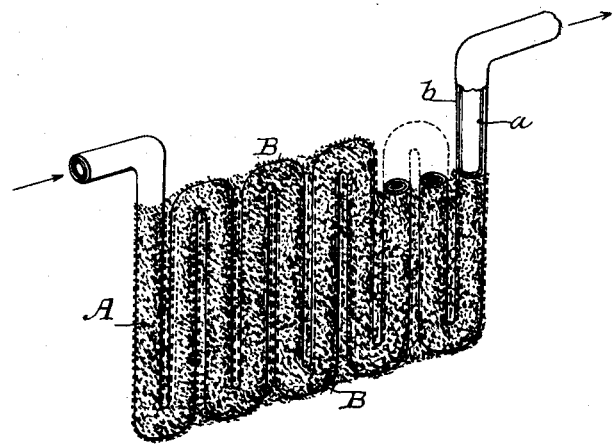

(No Model.)

W. A. SHAW.
SECONDARY BATTERY.

No. 266,262. Patented Oct. 17, 1882.

Witnesses:
E. E. Masson
Philip Mauro

Inventor:
Wm Anthony Shaw
by A. Pollok
his attorney

UNITED STATES PATENT OFFICE.

WILLIAM ANTHONY SHAW, OF BROOKLYN, ASSIGNOR OF ONE-HALF TO LEBBEUS K. ROGERS, OF NEW YORK, N. Y.

SECONDARY BATTERY.

SPECIFICATION forming part of Letters Patent No. 266,262, dated October 17, 1882.

Application filed September 18, 1882. (No model.)

*To all whom it may concern:*

Be it known that I, WILLIAM ANTHONY SHAW, of Brooklyn, in the county of Kings and State of New York, have invented a new and useful Improvement in Secondary Batteries, which improvement is fully set forth in the following specification.

This invention relates to secondary or polarization batteries or electric accumulators for storing or conserving electrical energy, and particularly to the secondary batteries or accumulators having electrodes formed of a conducting base or support primarily coated or combined with oxide of lead or other active material.

It has for its object to improve the construction and operation of the battery in several respects.

In charging these batteries, particularly with strong currents, I have discovered that the temperature is raised, and that the rise interferes with charging, diminishing the storage capacity of the apparatus. To overcome this objection I have combined with the batteries means for artificially cooling the same. For this purpose the inclosing-case of the battery may be jacketed; or a cooling device may be inserted in the said case between or among the electrodes, or in the electrolyte or filling material. It is deemed most advantageous, however, to make the electrodes (one or more or all) hollow, so as to admit of the introduction into or the circulation through the same of a refrigerant or cooling medium, since this gives a more perfect control of the temperature. In order to secure for the electrode an extended surface, which is advantageous with respect to the capacity, as well for retaining the active material as for the control of the temperature, the electrode or body thereof is made with irregular instead of plain walls. This irregularity could be secured by corrugating the walls of a box-like electrode; but it is better attained by forming the electrode or body thereof of a tube bent or folded upon itself. The walls of this tube could be fluted or corrugated, if desired; but a plain tube answers well, the spaces between the folds or convolutions forming receptacles for the active material, and leaving exposed a large surface area. The electrode or the body thereof is or may be made of lead or other suitable material. The present invention, however, contemplates a special improvement in the material. I have found that an alloy of lead and bismuth is much more easily oxidized, and is, besides, a better conductor than lead alone, and that it is for these reasons, and perhaps others, better adapted to the making of electrodes than lead. The electrodes are therefore made in whole or in part of this alloy. An electrode or body for an electrode made as above described can be used without any coating of active material; or it can be coated with any suitable active material.

The present invention contemplates a special improvement in the active material—to wit, the addition to the lead or lead oxide, or like material, of sulphur, and, further, the admixture of the said material into a paste with sulphuric acid.

The present invention also contemplates an improvement in the electrolyte or filling material between the electrodes. For this purpose is used a solid compound or salt, which is adapted to be dissolved, and whereof the solution is an electrolytic liquid mixed with more or less inert or porous material. For example, a mixture of nitrate of potash and earth is used.

The invention further contemplates a special preparation of electrodes, whereby they are rendered more active—to wit, the coating thereof with nitrate of potash or similar salt or compound. For this purpose, after the application of the lead compound or active porous material, the electrode is dipped into a solution of nitrate of potash, then removed therefrom and dried. The dipping and drying are repeated several times. The deposit or glazing thus made not only improves the action of the electrode, but also serves as a protection to the previously-applied active material.

The following is a description of what is deemed the best mode of carrying the invention into effect, reference being had to the accompanying drawings, which form a part of this specification.

Figure 2:
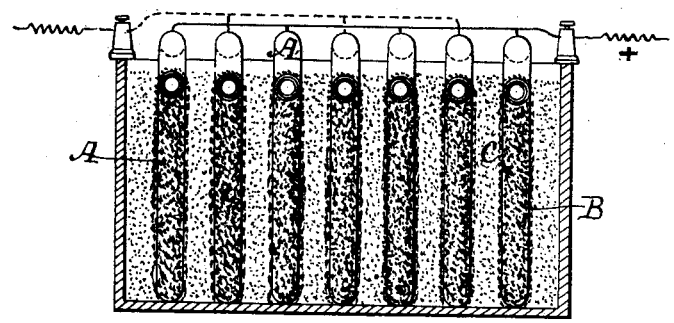
Figure 3:
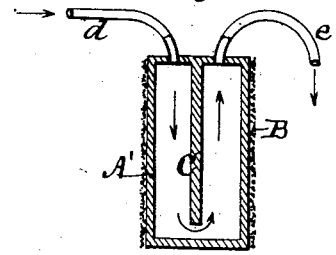

In said drawings, Figure 1 is a perspective, partly in section, of an electrode; Fig. 2, a vertical longitudinal section of a battery comprising a series of such electrodes, and Fig. 3 a vertical section of a modified form of electrode.

A is the body of the electrode, formed of a pipe bent upon itself. The interior $a$ of the pipe is lead. The exterior $b$ is an alloy of lead and bismuth. The proportions may vary; but an alloy containing one-tenth of one per cent. ($\frac{1}{10}$ of 1%) and upward of bismuth gives excellent results. Even a less percentage of bismuth has a powerful effect. The pipe could be made entirely of the alloy, if desired; but it is preferred to have a lead lining to render it less liable to be eaten through. The exterior and interior could be pressed out together from a pipe-press after the fashion of tin-lined lead pipe.

The active material B consists of comminuted lead, red lead, or other compound of lead—such as white lead, litharge, the puce-colored oxide, or lead sulphate—mixed with sulphur and ground into a paste with dilute sulphuric acid. The lead or lead compound can be mixed with sulphur in various proportions. Ten parts of red lead to one-half part of flowers of sulphur or pulverized stick-sulphur, or equal parts white lead and sulphur, give good results; but a greater or less quantity of sulphur can be used. This active material is applied with a trowel or in other suitable way. The pipe is covered and the spaces or receptacles between the folds are filled with the paste. To apply the glazing or exterior coating, the electrode is dipped into a saturated solution of, say, nitrate of potash in water. It is then removed, and the solvent is allowed to evaporate. A second dipping and drying follow, and the operations are repeated until a coating of the proper thickness is obtained. When a number of electrodes are thus prepared they are ready to be assembled in a cell or battery. To do this they are arranged side by side, as shown in Fig. 1, or in other suitable way, and the space between them is filled with a mixture, C, comprising a solid salt (whereof the solution is an electrolyte—such, for example, as nitrate of potash, nitrate of soda, or mixtures thereof) and an absorbent medium—such, for example, as earth (say garden-loam) containing more or less mold—the two kinds of material being in about equal proportions. For the nitrates other salts may be substituted—for example, the chromates, chlorides, chlorates, sulphates, sulphides, acetates, iodides, &c.—and for the earth sand, sawdust, asbestus, pumice, glass, and the like. This solid mixture is moistened with water, with dilute sulphuric acid, or with a solution of other suitable acid, or of a salt or an oxide.

The electrodes of the battery arranged as just described are connected with binding-posts for connecting the exterior conductors thereto. In charging and discharging the temperature is controlled by circulating a suitable medium—cold water or air—through the pipe forming the body A of the electrodes. The electrode shown in Fig. 3 consists of a box-like body, A', divided by a partition, $c$, extending nearly to the bottom. Inlet and outlet pipes $d$ $e$ communicate with the interior of the electrode on opposite sides of the partition. The electrode is coated with active material B.

Modifications may be made in the details of the invention, and portions of the invention may be used separately.

Electrodes such as described may be used in any suitable electrolytic liquid.

The various active materials specified or suggested in my application for improvement in secondary batteries, filed April 14, 1882, and officially numbered 58,313, of which the present application is a division and continuation, can be applied to the tubular or box-like electrodes in any suitable manner, such as specified in said original application. Pressure can be used to force the active material between the bends in the tube. The method described of glazing the active coating with nitrate can be used to apply active material to the base or support of the electrode.

An electrode of the general serpentine form shown in Figs. 1 and 2 could be made of a solid rod instead of a tube.

The invention is in part applicable to other than secondary batteries—to wit, to primary batteries.

The alloy of lead and bismuth may be comminuted or oxidized and used as the active material, alone or in conjunction with lead, red lead, or other lead compound, in connection with sulphur, or with both lead or lead compound and sulphur, or with other material or materials.

Electrodes of the lead-and-bismuth alloy may be made in any of the forms specified in the application aforesaid.

Having now fully described my said invention and the manner of carrying the same into effect, what I claim is—

1. The combination, with a secondary or other galvanic battery, of means, as indicated, for artificially cooling the same, substantially as described.

2. A hollow electrode, substantially as described, having its exterior in contact with the electrolyte, and provided with an interior cavity having close walls, as set forth.

3. In a secondary battery, a plate-like electrode formed of a rod or tube bent upon itself and primarily coated or combined with active material, substantially as described.

4. An electrode formed of a tube bent or folded upon itself, substantially as described.

5. In a secondary battery, a hollow or tubular electrode coated on the exterior with active material, and provided with an interior cavity having close walls, substantially as described.

6. A serpentine tubular electrode having the spaces between the bends or coils filled or packed with active material, substantially as described.

7. An electrode formed in whole or in part of an alloy of lead and bismuth, substantially as described.

8. An electrode having applied thereto a mixture of red lead or like material and sulphur, substantially as described.

9. An electrode for a secondary battery, coated with a paste of lead compound or other active material and sulphuric acid, substantially as described.

10. An electrode for secondary batteries, comprising, in combination with the conducting-support, an active layer or coating which contains sulphur, substantially as described.

11. The electrodes of a secondary battery, comprising a conducting body or support primarily coated or combined with active material—such as lead oxide—in combination with a solid filling material between the electrodes, comprising a non-conducting pulverulent porous material—such as earth or sand—and a soluble salt—such as alkaline nitrate—substantially as described.

12. The electrodes of a secondary battery, in combination with a solid filling material of alkaline nitrate and earth, substantially as described.

13. The method of preparing electrodes of secondary batteries by dipping the electrode into a solution of nitrate of potash or other salt or salts, removing it from said solution, and evaporating the solvent, all prior to the immersion of the electrode in the battery-fluid, substantially as described.

14. An electrode having the active coating glazed with nitrate of potash or its equivalent, substantially as described.

15. A secondary battery comprising the case, the tubular electrodes with their active coating, and the solid filling containing a soluble salt or salts, substantially as described.

16. In a galvanic battery, an electrode having in its interior a circuitous passage with imperforate walls, and provided with an inlet and an outlet opening communicating with said passage, substantially as described.

In testimony whereof I have signed this specification in the presence of two subscribing witnesses.

WM. ANTHONY SHAW.

Witnesses:
C. J. HEDRICK,
H. B. ZEVELY.